United States Patent
Sugawara et al.

(10) Patent No.: US 8,958,161 B2
(45) Date of Patent: Feb. 17, 2015

(54) ZOOM LENS AND PROJECTOR USING THE SAME

(71) Applicant: Canon Kabushiki Kaisha, Tokyo (JP)

(72) Inventors: Saburo Sugawara, Utsunomiya (JP); Yusuke Akiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/025,702

(22) Filed: Sep. 12, 2013

(65) Prior Publication Data
US 2014/0078597 A1 Mar. 20, 2014

(30) Foreign Application Priority Data
Sep. 14, 2012 (JP) ................. 2012-203004

(51) Int. Cl.
*G02B 15/14* (2006.01)
*G02B 15/17* (2006.01)

(52) U.S. Cl.
CPC ................ *G02B 15/14* (2013.01); *G02B 15/17* (2013.01)
USPC ......................................... 359/683; 359/676

(58) Field of Classification Search
CPC ........ G02B 15/14; G02B 15/16; G02B 15/17; G02B 15/163
USPC ................................... 359/676, 683
See application file for complete search history.

(56) References Cited

U.S. PATENT DOCUMENTS

| 8,570,662 | B2 * | 10/2013 | Eguchi et al. ................. | 359/684 |
| 2002/0063970 | A1 * | 5/2002 | Uzawa et al. ................. | 359/689 |
| 2003/0202257 | A1 * | 10/2003 | Uzawa et al. ................. | 359/685 |
| 2012/0200940 | A1 * | 8/2012 | Ohmoto ....................... | 359/683 |

FOREIGN PATENT DOCUMENTS

JP 2003-287680 A 10/2003

* cited by examiner

*Primary Examiner* — Scott J Sugarman
(74) *Attorney, Agent, or Firm* — Canon USA Inc. IP Division

(57) ABSTRACT

A zoom lens includes a negative lens unit arranged closest to an enlargement conjugate side among lens units having negative refractive power included in the zoom lens, at least one positive lens unit having positive refractive power arranged closer to the enlargement conjugate side than the negative lens unit, and a rear lens unit including at least one lens unit and arranged closer to a reduction conjugate side than the negative lens unit, wherein a distance between adjacent lens units is changed during zooming, a stop is arranged closer to the reduction conjugate side than the negative lens unit, the rear lens unit includes at least one positive lens, and the positive lens satisfies a predetermined condition.

5 Claims, 9 Drawing Sheets

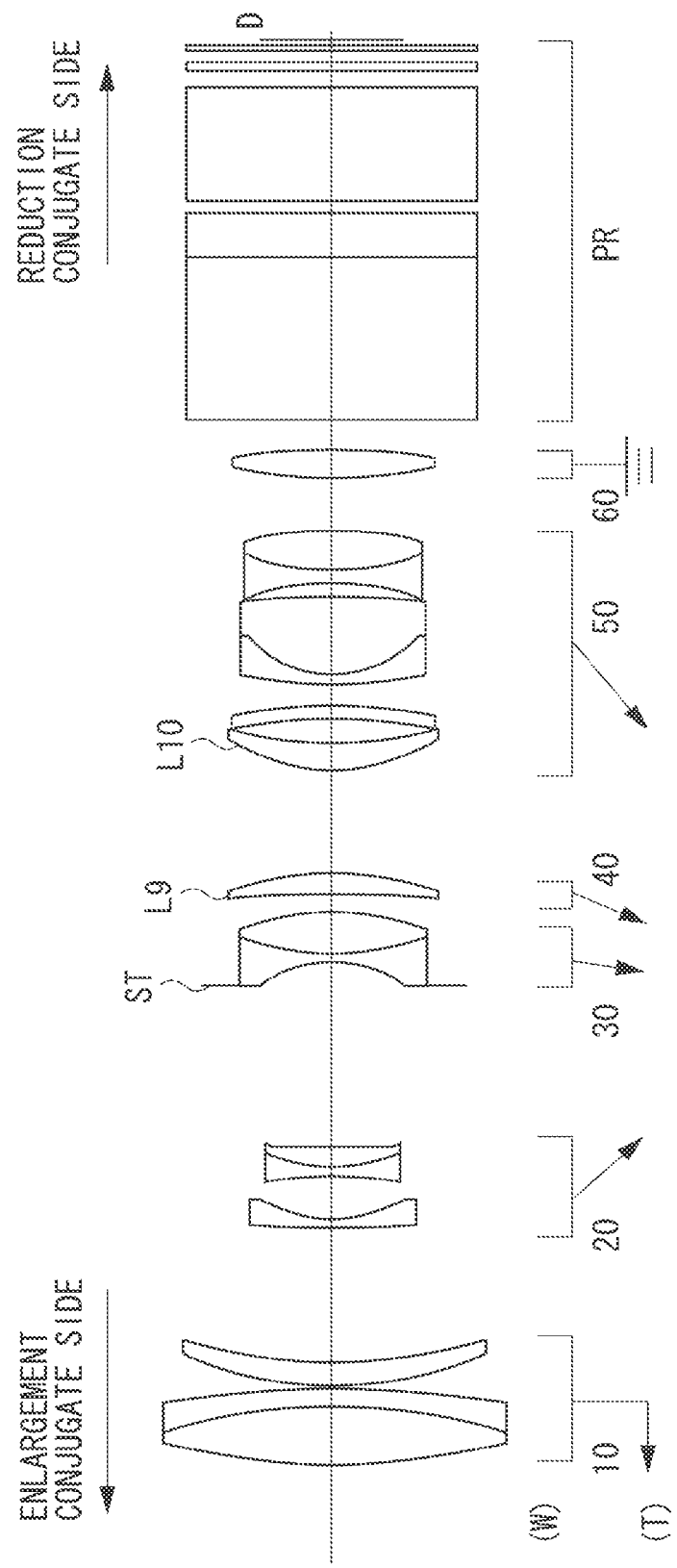

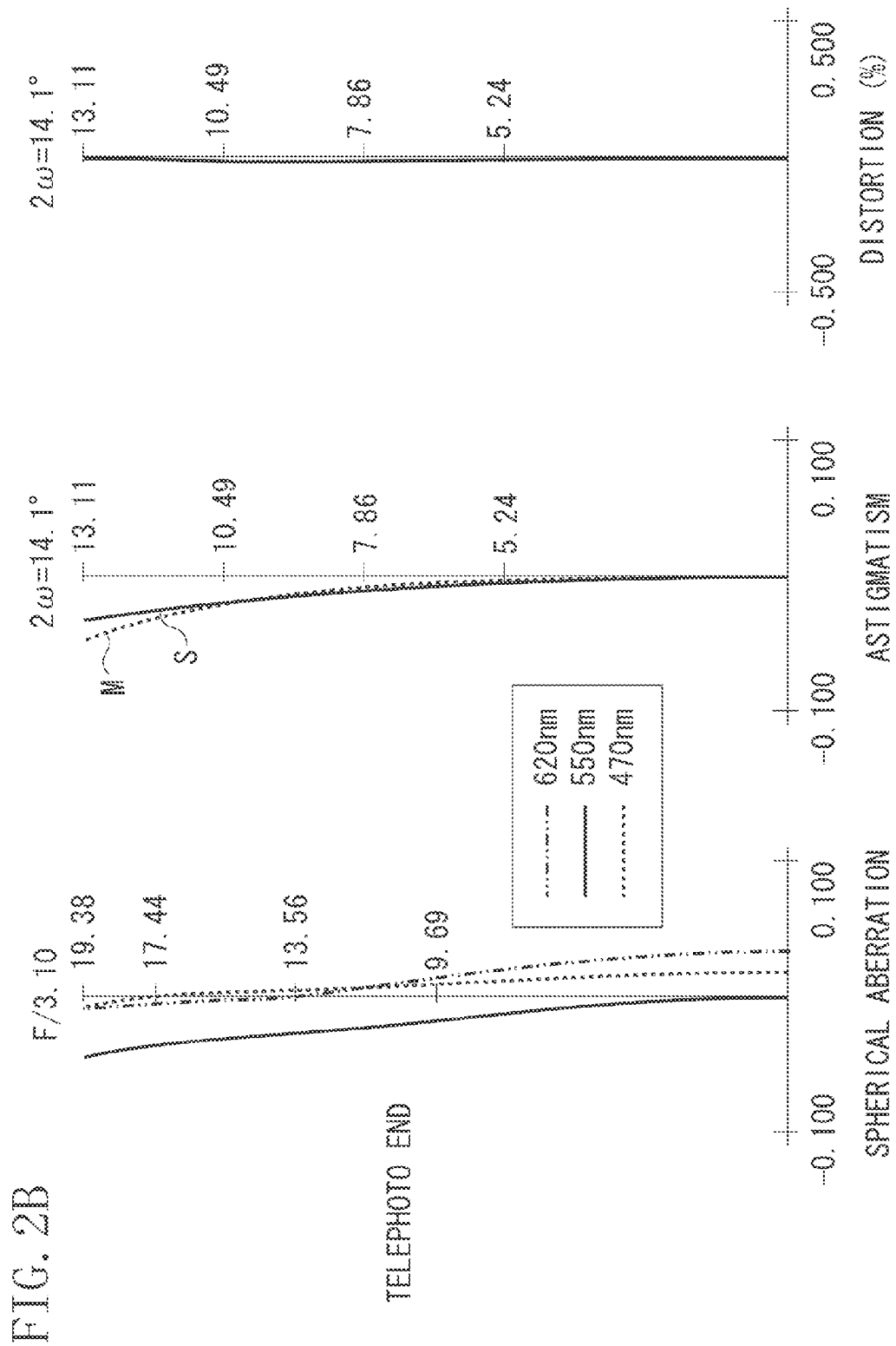

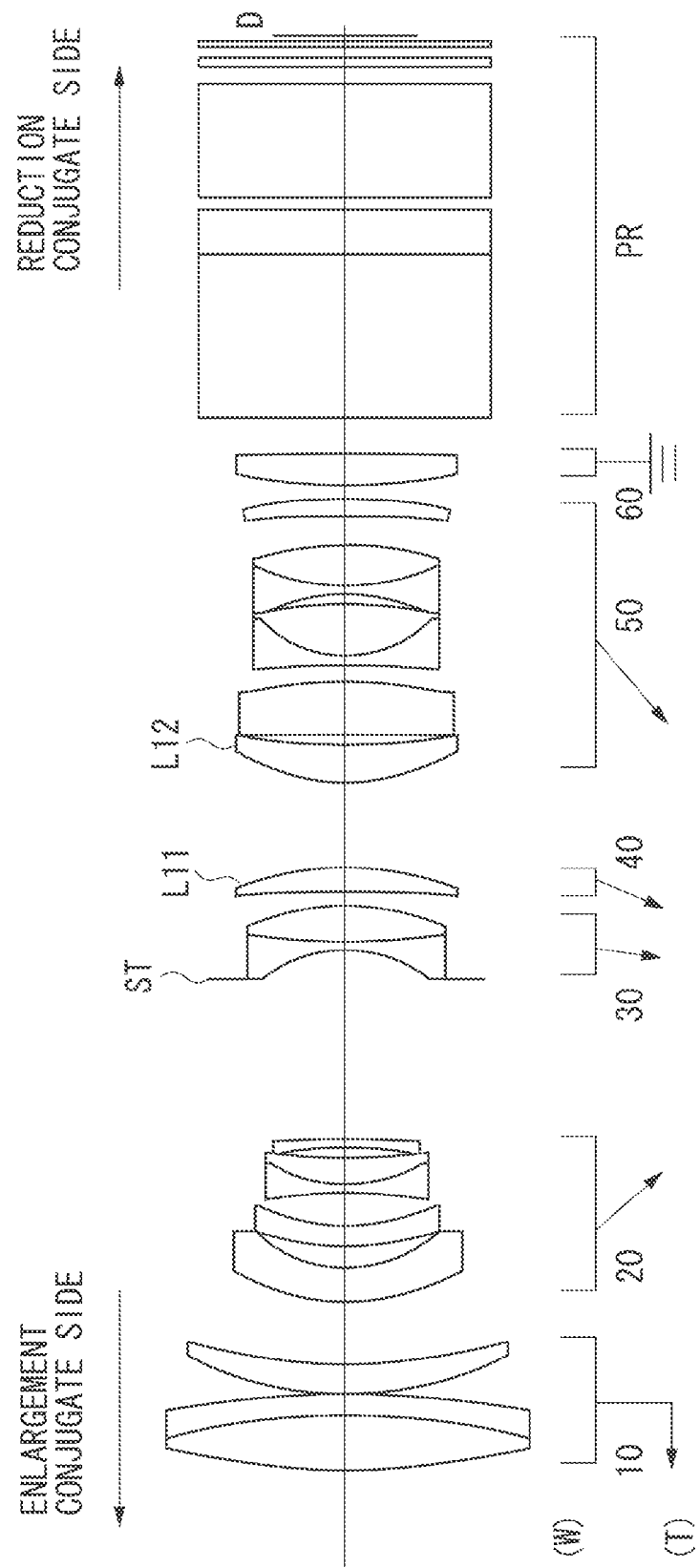

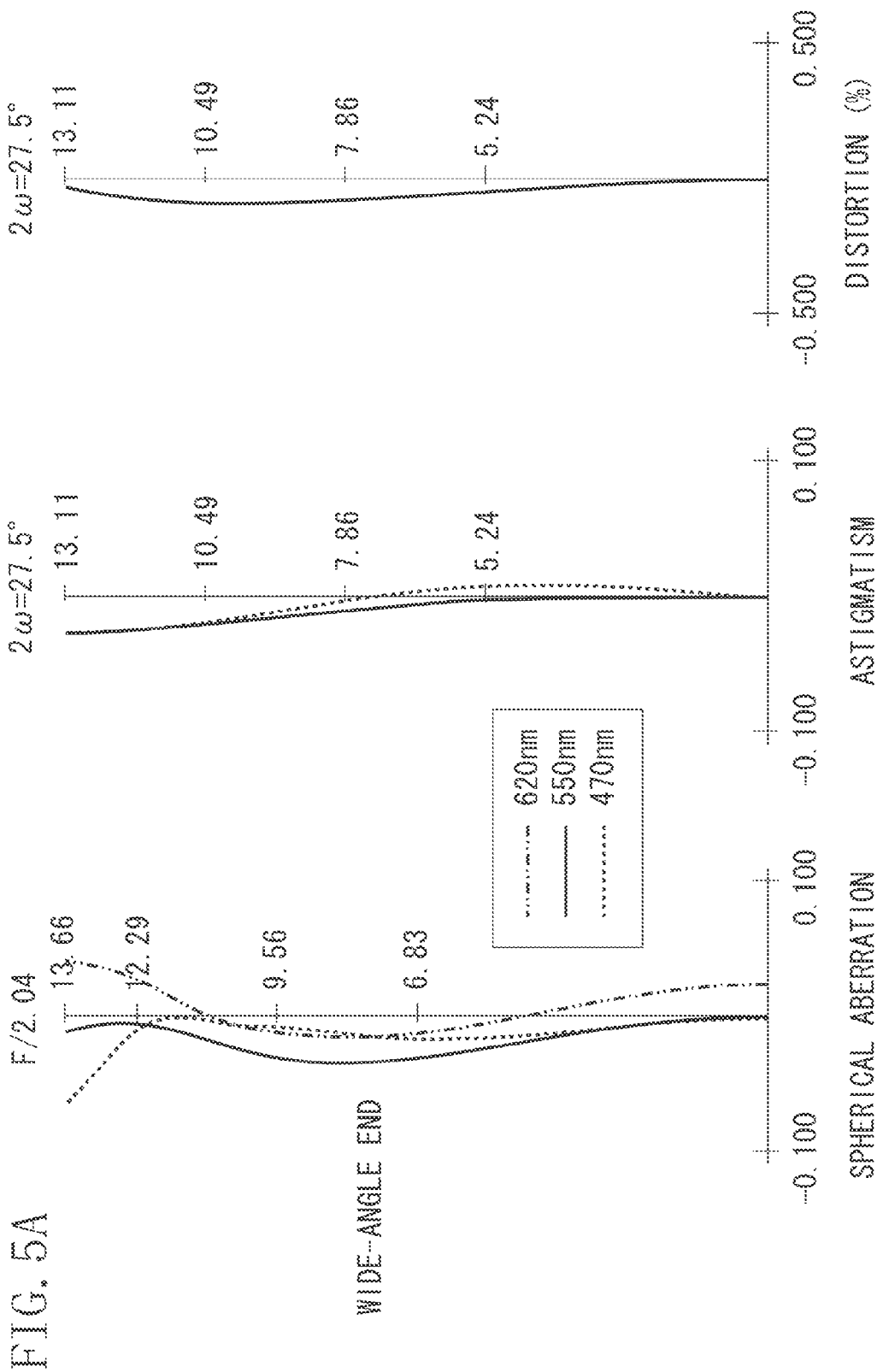

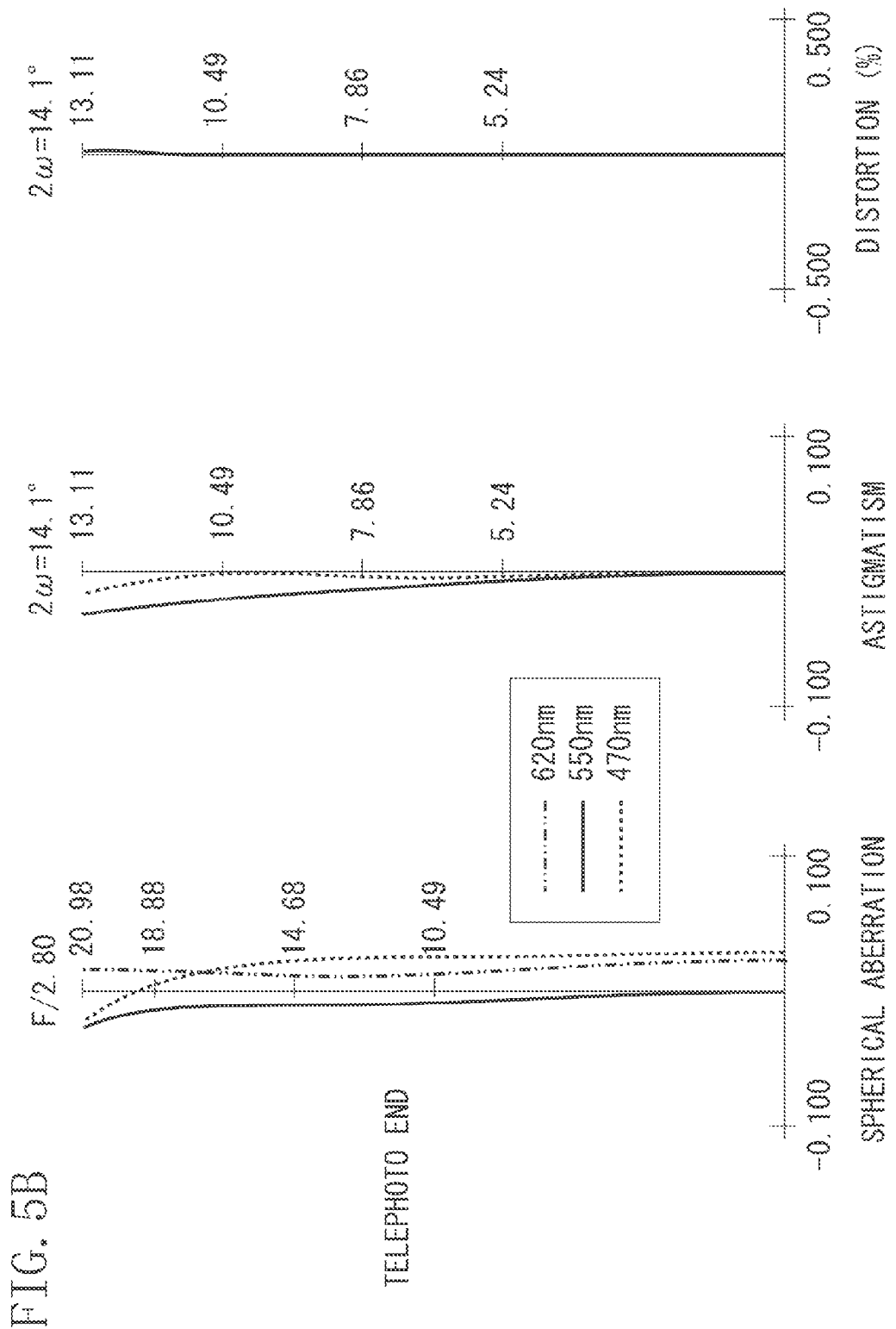

CHROMATIC ABERRATION OF MAGNIFICATION

CHROMATIC ABERRATION OF MAGNIFICATION

WHEN APPLIED TO LIQUID-CRYSTAL PROJECTOR

ZOOM LENS AND PROJECTOR USING THE SAME

BACKGROUND OF THE INVENTION

1. Field of the Invention

The present invention relates to a zoom lens, and particularly relates to a zoom lens suitably used in a projector.

2. Description of the Related Art

A liquid crystal projector is a device capable of projecting an image generated by a personal computer, a video apparatus, and the like on a large screen, and is used in various situations including a presentation and a meeting. In a projection optical system used in the liquid crystal projector, it is desired to secure, first, as a configuration, a front lens diameter that can be housed in a projector body, and a long back focus for securing a space for a color combining prism arranged between the projection optical system and a liquid crystal panel. Further, to uniform the contrast characteristic within a liquid crystal panel screen, a telecentric optical system is desired, in which a pupil at a liquid crystal panel (reduction conjugate plane) side is positioned at an infinite distance. Further, as a performance, favorable reduction of various aberrations in the entire zoom range is required.

In the past, as a type of the telecentric projection optical system, there has been a negative lead type zoom lens, in which a lens unit having negative refractive power is located at the forefront, and a large number of negative lead type wide-angle zoom lenses that secure the long back focus have been discussed.

However, the negative lead type zoom lenses have a problem of increasing in size when seeking a telephoto performance while minimizing an increase in size of the diameter.

Meanwhile, a positive lead type zoom lens, in which a lens unit having positive refractive power is located at the forefront, is discussed in Japanese Patent Application Laid-Open No. 2003-287680.

Japanese Patent Application Laid-Open No. 2003-287680 discusses a zoom lens includes, in order from a screen side (enlargement conjugate side) to a liquid crystal panel side (reduction conjugate plane side), a first lens unit having positive refractive power, a second lens unit having negative refractive power, a third lens unit having negative refractive power, a fourth lens unit having positive refractive power, a fifth lens unit having positive refractive power, and a sixth lens unit having positive refractive power. During zooming from a wide-angle end to a telephoto end, the second lens unit moves to the reduction conjugate side, the third lens unit, the fourth lens unit, and the fifth lens unit move to the enlargement conjugate side.

SUMMARY OF THE INVENTION

According to an aspect of the present invention, a zoom lens includes a negative lens unit arranged closest to an enlargement conjugate side among lens units having negative refractive power included in the zoom lens, at least one positive lens unit having positive refractive power arranged closer to the enlargement conjugate side than the negative lens unit, a rear lens unit including at least one lens unit and arranged closer to a reduction conjugate side than the negative lens unit, wherein a distance between adjacent lens units in the zoom lens is changed during zooming, a stop is arranged closer to the reduction conjugate side than the negative lens unit, the rear lens unit includes at least one positive lens, and following conditions are satisfied:

$|Lp/L| < 0.2$ $0.02 < \Delta\theta gFp < 0.08$ $Ndp > 1.75$ $0.5 < \phi p / \sqrt{(\phi w \cdot \phi t)} < 3.0$ $1.0 < fc/ft < 1.5$ where, at a telephoto end, a distance between the stop and a lens surface vertex, farthest from the stop, of the positive lens is Lp, a configuration length of the zoom lens is L, an anomalous dispersion characteristic of the positive lens is $\Delta\theta gFp$, a refractive index at d-line of the positive lens is Ndp, power of the positive lens when there is the one positive lens or a sum of power of a plurality of the positive lenses when there is a plurality of the positive lenses is $\phi p$, power of the entire zoom lens at a wide-angle end is $\phi w$, power of the entire zoom lens at the telephoto end is $\phi t$, a focal length of the positive lens unit at the telephoto end when there is the one positive lens unit or a composite focal length of a plurality of the positive lens units at the telephoto end when there is a plurality of the positive lens units is fc, and a focal length of the entire zoom lens at the telephoto end is ft.

Further features of the present invention will become apparent from the following description of exemplary embodiments with reference to the attached drawings.

BRIEF DESCRIPTION OF THE DRAWINGS

FIG. 1 is a cross sectional view of a zoom lens of a first exemplary embodiment of the present invention and other optical elements.

FIGS. 2A and 2B are aberration diagrams at a wide-angle end and at a telephoto end of a numerical example 1.

FIG. 4 is a cross sectional view of a zoom lens of a second exemplary embodiment of the present invention and other optical elements.

FIGS. 5A and 5B are aberration diagrams at a wide-angle end and at a telephoto end of a numerical example 2.

DESCRIPTION OF THE EMBODIMENTS

Figure 2A:
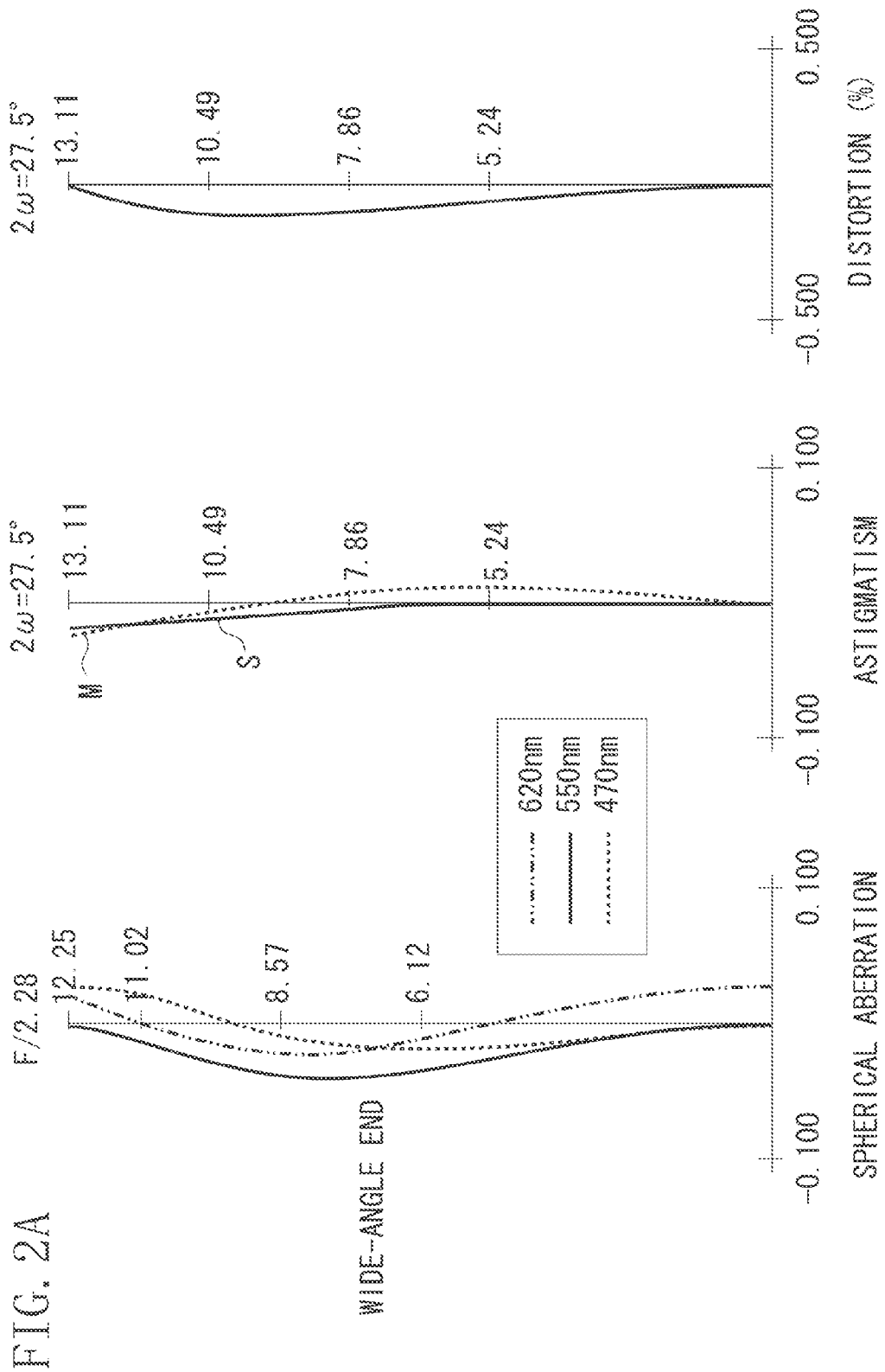
Figure 3A:
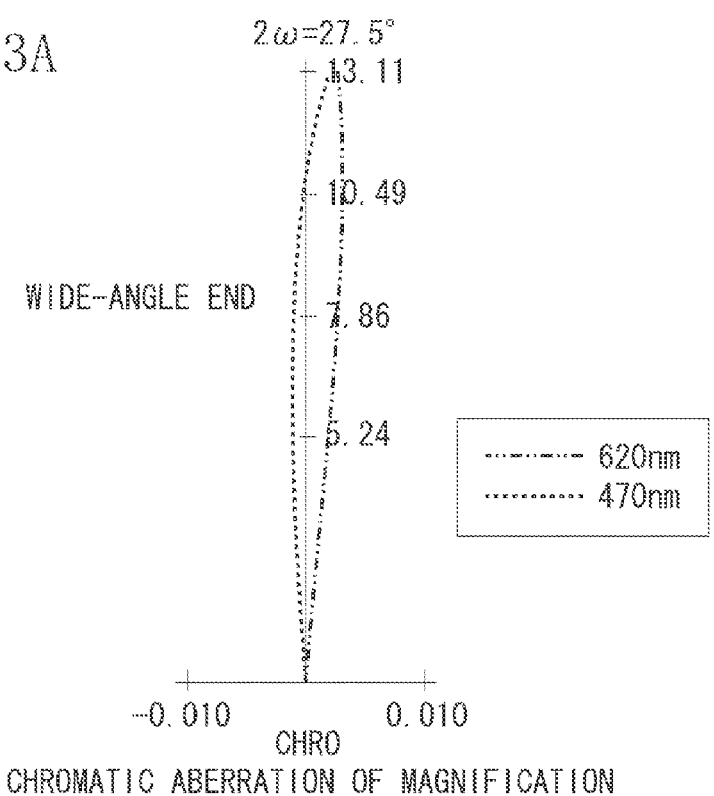
FIGS. 3A and 3B are lateral chromatic aberration (chromatic aberration of magnification) diagrams at the wide-angle end and at the telephoto end of the numerical example 1.
Figure 3B:
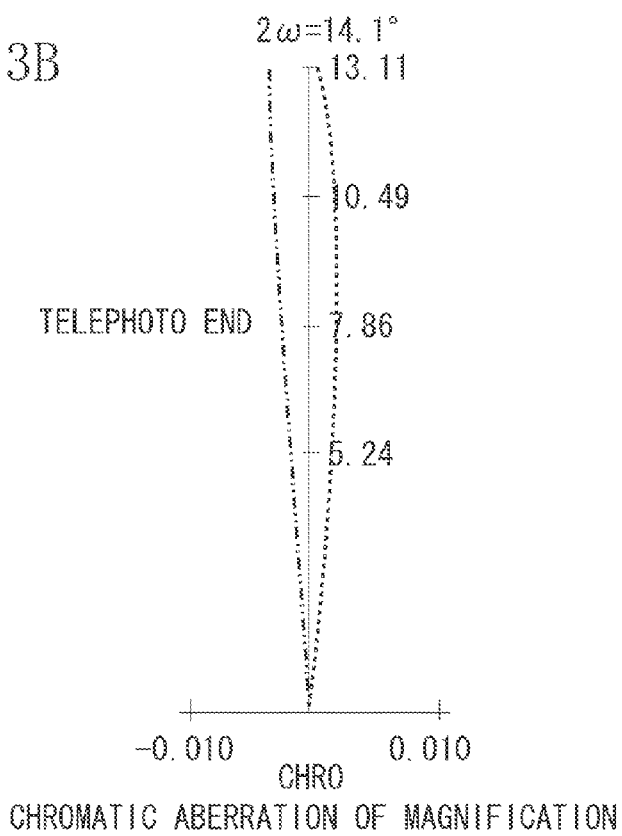
Figure 6A:
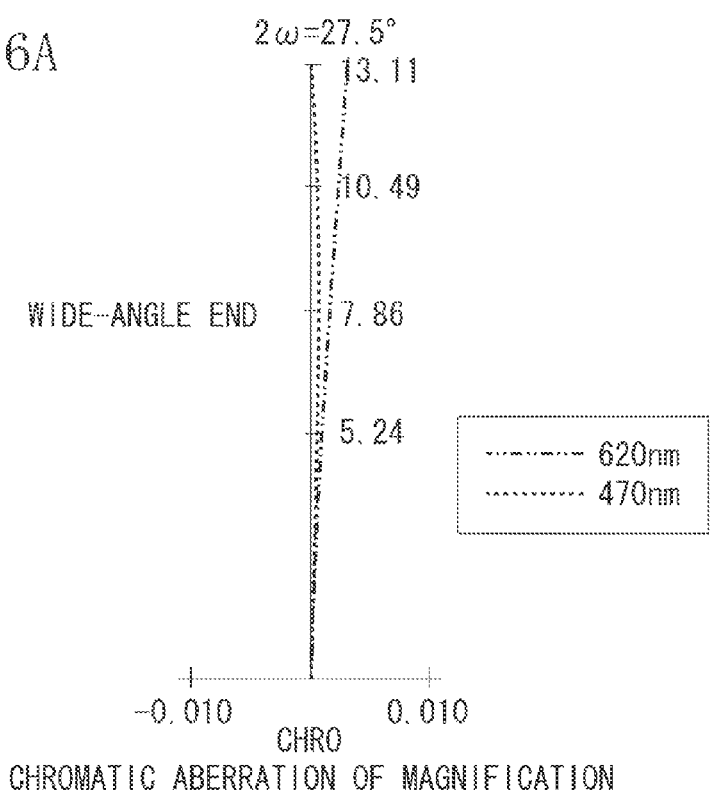
FIGS. 6A and 6B are lateral chromatic aberration diagrams at the wide-angle end and at the telephoto end of the numerical example 2.
Figure 6B:
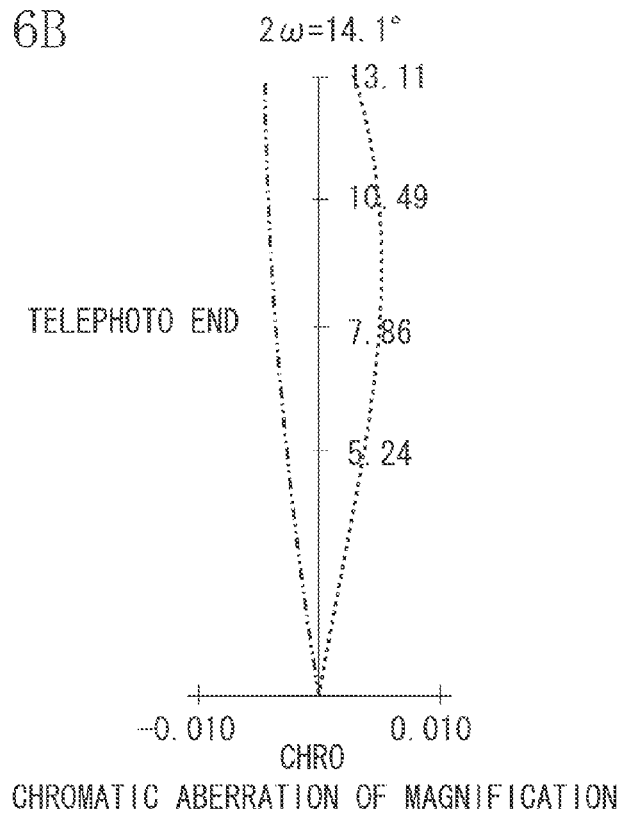

The zoom lens discussed in the above-described Japanese Patent Application Laid-Open No. 2003-287680 uses an anomalous dispersion glass for the second positive lens from the enlargement conjugate side and the second positive lens from the reduction conjugate side. However, there is a problem that correction of axial chromatic aberration of the third and the subsequent lens units is not sufficient.

Hereinafter, a first exemplary embodiment of the present invention will be described with reference to FIGS. 1, 2A, 2B, 3A, and 3B.

FIG. 1 is a cross sectional view of a zoom lens of the first exemplary embodiment and a glass block PR at a wide-angle end, which is arranged between the zoom lens and a light modulation element D such as a liquid crystal panel. The zoom lens includes 16 lenses as a total, and is made of six lens units where mutual distances are changed during zooming. To be specific, the zoom lens includes, in order from an enlargement conjugate side such as a screen, a first lens unit 10 having positive refractive power, a second lens unit 20 having negative refractive power, a third lens unit 30 having negative refractive power, a fourth lens unit 40 having positive refractive power, a fifth lens unit 50 having positive refractive power, and a sixth lens unit 60 having positive refractive power.

For zooming, the first lens unit 10 and the sixth lens unit 60 are stationary or fixed. During zooming from the wide-angle end to the telephoto end, the second lens unit 20 moves to the reduction conjugate side, and the third lens unit 30, the fourth lens unit 40, and the fifth lens unit 50 move to the enlargement conjugate side. A glass block PR illustrated in FIG. 1, such as a color combining prism, is arranged between the zoom lens and the light modulation element D such as a liquid crystal panel. Further, the reduction conjugate side means a light modulation element D side.

A numerical example of the first exemplary embodiment will be herein described as a numerical example 1. The surface number in the numerical example is a number given to each lens surface in order from the enlargement conjugate side, r represents a curvature radius (mm), d represents a surface distance (m), and nd and vd respectively represent a refractive index and an Abbe number at the d-line of a lens material. The same applies to a numerical example 2.

FIGS. 2A and 2B are diagrams illustrating various aberration characteristic of the zoom lens at the wide-angle end and at the telephoto end. The broken lines, solid lines, and two-dot chain lines in the spherical aberration diagrams of FIGS. 2A and 2B, and in the lateral chromatic aberration diagrams of FIGS. 3A and 3B indicate aberrations with respect to light having wavelengths of 470 [nm], 550 [nm], and 620 [nm], respectively. In the astigmatism diagrams of FIGS. 2A and 2B, S indicated in the solid line represents astigmatism in a sagittal cross section, M indicated in the broken line represents astigmatism in a meridional cross section. The aberration diagram at the wide-angle end is an aberration diagram when a projection distance (object distance) is 5.39 m. The aberration diagram at the telephoto end is an aberration diagram when the projection distance is 10.5 m.

The zoom lens of the first exemplary embodiment includes a positive lens P that satisfies a predetermined condition at a position that satisfies the following condition (1a). The condition (1a) is:

$$|Lp/L|<0.2 \quad (1a)$$

where, at the telephoto end, a distance between a stop ST and a lens surface vertex of, farthest from the stop ST, of the positive lens P is Lp, and a lens configuration length is L.

Here, the lens configuration length L is a distance from a lens surface vertex of the enlargement conjugate side of a lens having power arranged closest to the enlargement conjugate side among the lenses included in the zoom lens to a lens surface vertex at the reduction conjugate side of a lens having power arranged closest to the reduction conjugate side.

More desirably, $$|Lp/L|<0.15 \quad (1b) \text{ may be satisfied.}$$

The condition (1a) is a condition that defines a position at which the positive lens P having an anomalous dispersion characteristic that satisfies the following condition (2a) is arranged. Since the distance from an optical axis of an axial marginal ray becomes small, outside the scope of the condition (1a), correction effect of axial chromatic aberration is reduced.

In the first exemplary embodiment, the positive lens P is a lens L9 or a lens L10, and a variable magnification lens unit including the positive lens P is the fourth lens unit 40 or the fifth lens unit 50.

Further, $$0.02<\Delta\theta gFp<0.08 \quad (2a)$$

is satisfied, where the anomalous dispersion characteristic of the positive lens P is $\Delta\theta gFp$.

Here, $\Delta\theta gFp=\theta gFp-(0.6438-0.001682\nu dp)$ and, $\theta gF$ is a relative partial dispersion expressed in the following condition:

$$\theta gF=(Ng-NF)/(NF-NC)$$

where $\nu dp$ is an Abbe number of the positive lens P.

More desirably, $$0.02<\Delta\theta gFp<0.03 \quad (2b) \text{ may be satisfied.}$$

The condition (2a) is a condition that defines the anomalous dispersion characteristic of the positive lens P. If the lower limit of the condition (2a) is exceeded, the correction effect of axial chromatic aberration is reduced and a secondary spectrum is increased. If the upper limit of the condition (2a) is exceeded, a currently existing glass becomes a glass having a small Abbe number, and the amount of generation of axial chromatic aberration generated in the positive lens P becomes large, and it becomes difficult for other negative lenses to balance axial chromatic aberration of the entire zoom lens.

Further, $Ndp>1.75$ (3a) is satisfied, where the refractive index at the d-line of the positive lens P is Ndp.

More desirably, $$Ndp>1.78 \quad (3b) \text{ may be satisfied.}$$

The condition (3a) is a condition that defines the refractive index of the positive lens P having an anomalous dispersion characteristic. If falling outside the scope of the condition (3a), the refractive index is lowered, and the correction effect of spherical aberration is reduced.

Further, $1.5<\phi p/\sqrt{(\phi w \cdot \phi t)}<3.0$ (4a) is satisfied, where power of the positive lens P when there is one positive lens P or a sum of power of a plurality of positive lenses P when there is a plurality of positive lenses P is $\phi p$, power of the entire zoom lens at the wide-angle end is $\phi w$, and power of the entire zoom lens at the telephoto end is $\phi t$.

More desirably, $$1.0<\phi p/\sqrt{(\phi w \cdot \phi t)}<2.5 \quad (4b) \text{ may be satisfied.}$$

If the lower limit of the condition (4a) is exceeded, the sum of power (or the power) of the positive lens P having an anomalous dispersion characteristic is decreased, and a secondary spectrum of axial chromatic aberration is increased. If the upper limit of the condition (4a) is exceeded, the sum of power (or the power) of the positive lens P becomes too strong, and the amount of generation of axial chromatic aberration by the positive lens P is increased, and it becomes difficult for other negative lenses to balance axial chromatic aberration of the entire zoom lens.

Here, a negative lens unit arranged closest to the enlargement conjugate side among the lens units having negative refractive power included in the zoom lens is a negative lens unit NU. When a positive lens unit PU having positive refractive power and arranged closer to the enlargement conjugate side than the negative lens unit NU is one, a focal length of the positive lens unit PU at the telephoto end is fc, and when there is a plurality of positive lens units PU, a composite focal length of a plurality of positive lens units at the telephoto end is fc. A focal length of the entire zoom lens at the telephoto end is ft. Here, the following condition is satisfied:

$$1.0 < fc/ft < 1.5 \tag{5a}$$

More desirably, $$1.1 < fc/ft < 1.3 \tag{5b}$$

may be satisfied.

If the lower limit of the condition (5a) is exceeded, axial chromatic aberration of the positive lens unit PU at the telephoto end is increased, and axial chromatic aberration of the entire zoom lens at the telephoto end is increased. If the upper limit of the condition (5a) is exceeded, a drawing amount of the lens becomes extremely large when focusing is performed by drawing or retracting the positive lens unit PU.

In the first exemplary embodiment, the negative lens unit NU arranged closest to the enlargement conjugate side among the negative lens units having negative refractive power included in the zoom lens is the second lens unit 20. At least one positive lens unit PU having positive refractive power and arranged closest to the enlargement conjugate side than the second lens unit 20 is the first lens unit 10.

By satisfying the above-described conditions (1a) to (5a), a favorable correction effect of axial chromatic aberration in the entire zoom range can be obtained.

In a conventional positive lead type zoom lens, to realize less axial chromatic aberration at the telephoto end, an anomalous dispersion glass has been used for the first lens unit having positive refractive power and arranged closest to the enlargement conjugate side.

However, in the case of a positive lead type zoom lens, lenses of the first lens unit have a largest effective diameter, and thus, the effective diameter of the anomalous dispersion glass used for the first lens unit is large, and the cost of the glass becomes too high.

That is, the present invention can suppress the generation of axial chromatic aberration without using the anomalous dispersion glass for the first lens unit 10 and the like that may be increased in diameter, and thus an effect of reducing the cost can also be obtained.

Further, another effect of the present invention is to sufficiently obtain the correction effect of axial chromatic aberration at the telephoto end.

Further, another effect of the present invention is to sufficiently secure an increase in size of the entire zoom lens and the back focus even when there are less lens units that move during zooming.

By satisfying the above-described conditions (1a) to (5a), a favorable correction effect of axial chromatic aberration in the entire zoom range can be obtained. However, more desirably, any of the following conditions may be further satisfied.

A relative partial dispersion of an i-th negative lens from the enlargement conjugate side among the negative lenses included in the positive lens unit PU (corresponding to the first lens unit 10 in the first exemplary embodiment) is $\theta gFni$, and power of the i-th negative lens is $\phi ni$. Further, a relative partial dispersion of an i-th positive lens from the enlargement conjugate side among the positive lenses included in the positive lens unit PU is $\theta gFpi$, and power of the i-th positive lens is $\phi pi$. At this time, a power average of the relative partial dispersion of all of the negative lenses included in the positive lens unit PU is $\theta gFAn$, and a power average of the relative partial dispersion of all of the positive lenses included in the positive lens unit PU is $\theta gFAp$, and these averages are expressed in the following expressions:

$$\theta gFAn = \Sigma(\theta gFni \cdot \phi ni)/\Sigma \phi ni$$

$$\theta gFAp = \Sigma(\theta gFpi \cdot \phi pi)/\Sigma \phi pi$$

At this time, the zoom lens satisfies:

$$|\theta gFAn - \theta gFAp| < 0.055 \tag{6a}$$

More desirably, $$|\theta gFAn - \theta gFAp| < 0.054 \tag{6b}$$

may be satisfied.

If falling outside the scope of the condition (6a), a difference between values of the power averages of the relative partial dispersion of the positive lens and of the negative lens included in the positive lens unit PU becomes too large, and thus the secondary spectrum of axial chromatic aberration is increased.

Further, a relative partial dispersion of a j-th negative lens from the enlargement conjugate side among the negative lenses included in the negative lens unit NU (corresponding to the second lens unit 20 in the first exemplary embodiment) is $\theta gFnj$, and power of the j-th negative lens is $\phi nj$. Further, a relative partial dispersion of a j-th positive lens from the enlargement conjugate side among the positive lenses included in the negative lens unit NU is $\theta gFpj$, and power of the j-th positive lens is $\phi pj$. At this time, a power average of the relative partial dispersion of all of the negative lenses included in the negative lens unit NU is $\theta gFBn$, and a power average of the relative partial dispersion of all of the positive lenses included in the negative lens unit NU is $\theta gFBp$, and these averages are expressed in the following expression:

$$\theta gFBn = \Sigma(\theta gFjn \cdot \phi nj)/\Sigma \phi nj$$

$$\theta gFBp = \Sigma(\theta gFjp \cdot \phi pj)/\Sigma \phi pj$$

At this time, the zoom lens satisfies:

$$|\theta gFBn - \theta gFBp| < 0.040 \tag{7a}$$

More desirably, $$|\theta gFBn - \theta gFBp| < 0.035 \tag{7b}$$

may be satisfied.

If falling outside the scope of the condition (7a), a difference between values of the power averages of the relative partial dispersion of the positive lens and of the negative lens associated with zooming of the negative lens unit NU becomes large, and the secondary spectrum of axial chromatic aberration is increased.

Further, a relative partial dispersion of a k-th negative lens from the enlargement conjugate side among the negative lenses included in the entire zoom lens is $\theta gFnk$, and power of the k-th negative lens is $\phi nk$. Further, the relative partial dispersion of a k-th positive lens from the enlargement conjugate side among the positive lenses included in the entire zoom lens is $\theta gFpk$, and power of the k-th positive lens is $\phi pk$. At this time, a power average of the relative partial dispersion of all of the negative lens included in the entire zoom lens is $\theta gFTn$, and a power average of the relative partial dispersion of all of the positive lenses included in the entire zoom lens is $\theta gFTp$, and these averages are expressed in the following expressions:

$$\theta gFTn = \Sigma(\theta gFnk \cdot \phi nk)/\Sigma \phi nk$$

$$\theta gFTp = \Sigma(\theta gFpk \cdot \phi pk)/\Sigma \phi pk$$

At this time, the zoom lens satisfies:

$$|\theta gFTn - \theta gFTp| < 0.04 \tag{8a}$$

More desirably, $$|\theta gFTn - \theta gFTp| < 0.03 \tag{8b}$$

may be satisfied.

If exceeding the scope of the condition (8a), a difference of values of the power averages of the relative partial dispersion of the positive lens and of the negative lens in the entire zoom lens becomes too large, and thus the secondary spectrum of axial chromatic aberration is increased.

Here, in the first exemplary embodiment, two positive lenses that satisfy the above conditions are used. In other words, each of the fourth lens unit 40 and the fifth lens unit 50 includes the positive lens P that satisfies the above conditions.

However, for example, even if it is configured such that only the lens L9 satisfies the above conditions, the effects of the present invention can be obtained. By contrast, even if it is configured such that only the lens L10 satisfies the above conditions, the effects of the present invention can be obtained.

That is, the zoom lens of the first exemplary embodiment includes a rear lens unit that is arranged closer to the reduction conjugate side than the negative lens unit NU, and that includes at least one lens unit. Then, if the rear lens unit includes at least one positive lens P that satisfies the conditions (1a) to (4a), an effect of favorably reducing axial chromatic aberration in the entire zoom range can be obtained. Note that the same applies to other exemplary embodiments.

Numerical Example 1

|    | r        | d     | nd    | vd   | θgF      |
|----|----------|-------|-------|------|----------|
| 1  | 123.308  | 9.85  | 1.487 | 70.2 | 0.53026  |
| 2  | −106.082 | 3.16  | 1.720 | 46.0 | 0.563939 |
| 3  | −188.372 | 0.22  |       |      |          |
| 4  | 65.115   | 4.05  | 1.516 | 64.1 | 0.534161 |
| 5  | 90.459   | d5    |       |      |          |
| 6  | 238.217  | 1.65  | 1.603 | 60.6 | 0.542254 |
| 7  | 26.675   | 7.52  |       |      |          |
| 8  | −60.008  | 1.40  | 1.516 | 64.1 | 0.534161 |
| 9  | 30.708   | 3.40  | 1.799 | 42.2 | 0.567353 |
| 10 | 207.738  | d10   |       |      |          |
| 11 Stop | ∞   | 3.83  |       |      |          |
| 12 | −25.981  | 1.83  | 1.698 | 30.1 | 0.603017 |
| 13 | 56.193   | 7.10  | 1.696 | 55.5 | 0.543426 |
| 14 | −46.339  | d14   |       |      |          |
| 15 | −479.991 | 4.05  | 1.808 | 22.7 | 0.630704 |
| 16 | −53.463  | d16   |       |      |          |
| 17 | 33.545   | 4.75  | 1.808 | 22.7 | 0.630704 |
| 18 | 63.732   | 4.19  |       |      |          |
| 19 | −119.184 | 2.53  | 1.516 | 64.1 | 0.534161 |
| 20 | −82.120  | 3.54  |       |      |          |
| 21 | 92.619   | 1.72  | 1.805 | 25.4 | 0.615555 |
| 22 | 20.404   | 13.75 | 1.603 | 60.6 | 0.542254 |
| 23 | −116.593 | 2.03  |       |      |          |
| 24 | −38.474  | 1.95  | 1.806 | 33.3 | 0.588114 |
| 25 | 38.482   | 7.35  | 1.516 | 64.1 | 0.534161 |
| 26 | −56.368  | d26   |       |      |          |
| 27 | 88.275   | 5.05  | 1.805 | 25.4 | 0.615555 |
| 28 | −167.93  | 3.94  |       |      |          |
| 29 | ∞        | 1.50  |       |      |          |
| 30 | ∞        | 28.00 | 1.516 | 64.1 |          |
| 31 | ∞        | 7.82  | 1.516 | 64.1 |          |
| 32 | ∞        | 2.04  |       |      |          |
| 33 | ∞        | 19.50 | 1.805 | 25.4 |          |
| 34 | ∞        | 3.10  |       |      |          |
| 35 | ∞        | 1.32  | 1.516 | 64.1 |          |
| 36 | ∞        | 2.08  |       |      |          |
| 37 | ∞        | 0.70  | 1.516 | 64.1 |          |
| 38 | ∞        | 1.24  |       |      |          |

Various data
Zoom ratio 1.97

|                   | Wide-angle end | Middle | Telephoto end |
|-------------------|----------------|--------|---------------|
| Focal length      | 53.6           | 75.31  | 105.6         |
| F-number          | 2.34           | 2.60   | 2.81          |
| Viewing angle     | 27.5           | 19.7   | 14.1          |
| Image height      | 13.1           | 13.1   | 13.1          |
| Total lens length | 243.86         | 243.86 | 243.86        |
| BF                | 1.24           | 1.24   | 1.24          |

Distance change during zooming

|     | Wide-angle end | Middle | Telephoto end |
|-----|-------|-------|-------|
| d5  | 20.35 | 33.32 | 44.08 |
| d10 | 28.13 | 15.01 | 3.65  |
| d14 | 2.77  | 2.83  | 1.26  |
| d16 | 17.63 | 8.78  | 1.59  |
| d26 | 8.83  | 17.77 | 27.13 |

Zoom lens unit data

| Unit | Start surface | Focal length |
|------|---------------|--------------|
| 1    | 1             | 126.526      |
| 2    | 6             | −42.092      |
| 3    | 11            | −100.771     |
| 4    | 15            | 73.459       |
| 5    | 17            | 253.632      |
| 6    | 26            | 71.905       |

FIG. 4 illustrates a cross sectional view of a zoom lens of a second exemplary embodiment of the present invention at a wide-angle end and a glass block PR arranged between the zoom lens and a light modulation element D such as a liquid crystal panel. A numerical example of the second exemplary embodiment is described as a numerical example 2. Various aberration diagrams of the numerical example 2 are illustrated in FIGS. 5A and 5B and FIGS. 6A and 6B. The aberration diagram at the wide-angle end is an aberration diagram when the projection distance is 5.39 m. The aberration diagram at the telephoto end is an aberration diagram when the projection distance is 10.5 m.

The second exemplary embodiment is a design example, in which the number of lenses of a second lens unit 20 and a fifth lens unit 50 is increased compared with the first exemplary embodiment so that a bright F-number is obtained.

In the second exemplary embodiment, lenses corresponding to the positive lens P are lenses L11 and L12.

The second exemplary embodiment satisfies the conditions (1a) to (8a), and can obtain effects similar to the first exemplary embodiment.

Numerical Example 2

|    | r         | d    | nd    | vd   | θgF     |
|----|-----------|------|-------|------|---------|
| 1  | 140.647   | 9.31 | 1.487 | 70.2 | 0.53026 |
| 2  | −118.400  | 3.23 | 1.723 | 37.9 | 0.58342 |
| 3  | −205.316  | 0.29 |       |      |         |
| 4  | 63.924    | 5.16 | 1.487 | 70.2 | 0.53026 |
| 5  | 91.543    | d5   |       |      |         |
| 6  | 39.391    | 5.93 | 1.487 | 70.2 | 0.53026 |
| 7  | 23.997    | 3.72 |       |      |         |
| 8  | 56.006    | 3.10 | 1.487 | 70.2 | 0.53026 |
| 9  | 32.162    | 5.88 |       |      |         |
| 10 | −105.220  | 1.54 | 1.487 | 70.2 | 0.53026 |
| 11 | 26.905    | 4.47 | 1.785 | 44.2 | 0.56355 |
| 12 | 118.493   | 1.81 |       |      |         |
| 13 | −72.147   | 1.39 | 1.772 | 49.6 | 0.55234 |
| 14 | −298.318  | d14  |       |      |         |
| 15 Stop | ∞    | 4.85 |       |      |         |
| 16 | −25.226   | 1.65 | 1.698 | 30.1 | 0.60302 |
| 17 | 119.876   | 6.01 | 1.729 | 54.6 | 0.54343 |
| 18 | −41.881   | d18  |       |      |         |
| 19 | −130.062  | 3.89 | 1.808 | 22.7 | 0.6307  |
| 20 | −46.278   | d20  |       |      |         |
| 21 | 36.691    | 6.27 | 1.808 | 22.7 | 0.6307  |
| 22 | 114.965   | 1.51 |       |      |         |
| 23 | −4112.167 | 9.20 | 1.729 | 54.6 | 0.55423 |
| 24 | −112.067  | 2.44 |       |      |         |

-continued

| 25 | −239.840 | 2.42 | 1.805 | 25.4 | 0.61655 |
| 26 | 21.602 | 8.62 | 1.603 | 60.6 | 0.54225 |
| 27 | −85.738 | 1.42 | | | |
| 28 | −39.819 | 1.77 | 1.806 | 33.2 | 0.58883 |
| 29 | 40.761 | 6.96 | 1.487 | 70.2 | 0.53026 |
| 30 | −57.571 | 4.92 | | | |
| 31 | −251.923 | 2.88 | 1.497 | 81.5 | 0.53859 |
| 32 | −101.121 | d32 | | | |
| 33 | 79.129 | 5.52 | 1.805 | 25.4 | 0.61655 |
| 34 | −218.787 | 3.84 | | | |
| 35 | ∞ | 1.50 | | | |
| 36 | ∞ | 28.00 | 1.516 | 64.1 | |
| 37 | ∞ | 7.82 | 1.516 | 64.1 | |
| 38 | ∞ | 2.04 | | | |
| 39 | ∞ | 19.50 | 1.805 | 25.4 | |
| 40 | ∞ | 3.10 | | | |
| 41 | ∞ | 1.32 | 1.516 | 64.1 | |
| 42 | ∞ | 2.08 | | | |
| 43 | ∞ | 0.70 | 1.516 | 64.1 | |
| 44 | ∞ | 1.24 | | | |

Various data
Zoom ratio 1.97

| | Wide-angle end | Middle | Telephoto end |
|---|---|---|---|
| Focal length | 53.5 | 77.3 | 105.6 |
| F-number | 2.04 | 2.40 | 2.80 |
| Viewing angle | 27.5 | 19.2 | 14.1 |
| Image height | 13.1 | 13.1 | 13.1 |
| Total lens length | 241.71 | 241.71 | 241.71 |
| BF | 1.25 | 1.25 | 1.25 |
| Distance change during zooming | | | |
| d5 | 7.23 | 22.06 | 32.73 |
| d14 | 27.36 | 13.04 | 1.61 |
| d18 | 2.87 | 2.77 | 0.97 |
| d20 | 14.46 | 5.17 | 1.03 |
| d32 | 2.46 | 11.34 | 18.04 |

Zoom lens unit data

| Unit | Start surface | Focal length |
|---|---|---|
| 1 | 1 | 134.409 |
| 2 | 6 | −44.683 |
| 3 | 15 | −124.527 |
| 4 | 19 | 86.288 |
| 5 | 21 | 201.869 |
| 6 | 33 | 72.178 |

Values of the conditions (1a) to (8a) in the first exemplary embodiment and in the second exemplary embodiment are described in Table 1. The values of the conditions (1a) to (3a) of the first exemplary embodiment indicate values of the lenses L9 and L10. The values of the conditions (1a) to (3a) of the second exemplary embodiment indicate values of the lenses L11 and L12.

The values of the condition (4a) are a value obtained by entering the sum of the power of the lenses L9 and L10 in $\phi p$ in the first exemplary embodiment, and is a value obtained by entering the sum of the power of the lenses L11 and L12 in $\phi p$ in the second exemplary embodiment.

TABLE 1

| | | First exemplary embodiment | | Second exemplary embodiment | |
|---|---|---|---|---|---|
| Condition number | Condition | Lens L9 | Lens L10 | Lens L11 | Lens L12 |
| (1a) | \|Lp/L\| | 0.082 | 0.141 | 0.102 | 0.147 |
| (2a) | ΔθgFp | 0.025192 | 0.025192 | 0.025192 | 0.025192 |
| (3a) | Ndp | 1.8081 | 1.8081 | 1.8081 | 1.8081 |

TABLE 1-continued

| | | First exemplary embodiment | | Second exemplary embodiment | |
|---|---|---|---|---|---|
| Condition number | Condition | Lens L9 | Lens L10 | Lens L11 | Lens L12 |
| (4a) | $\phi p/\sqrt{(\phi w \cdot \phi t)}$ | 1.934 | | 2.031 | |
| (5a) | fc/ft | 1.198 | | 1.273 | |
| (6a) | \|θgFAn−θgFAp\| | 0.032831 | | 0.05316 | |
| (7a) | \|θgFBn−θgFBp\| | 0.02964 | | 0.029231 | |
| (8a) | \|θgFTn−θgFTp\| | 0.017282 | | 0.018871 | |

Figure 7:
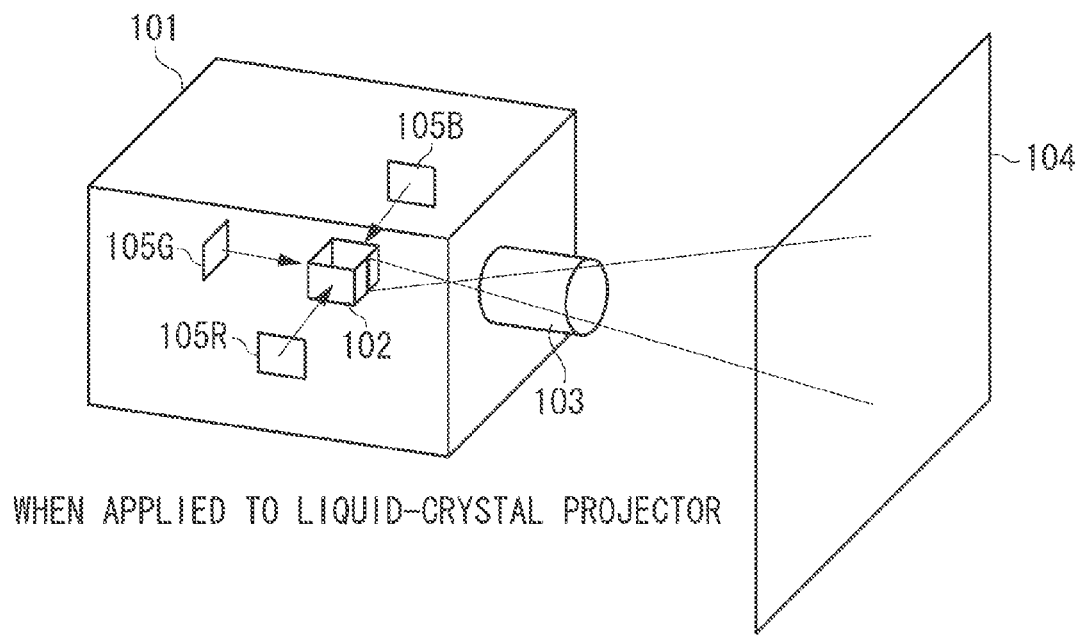
FIG. 7 is a schematic configuration diagram of a projector of a third exemplary embodiment of the present invention.

FIG. 7 illustrates a schematic configuration diagram of a projector 101 using the zoom lens of the first exemplary embodiment or of the second exemplary embodiment. A zoom lens 103 functions as a projection lens that projects light from liquid crystal panels 105R, 105G, and 105B as a light modulation element irradiated with light from a light source on a projection surface 104 such as a screen.

Note that the projector 101 may be a projector to which the zoom lens 103 is detachably attached.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-203004 filed Sep. 14, 2012, which is hereby incorporated by reference herein in its entirety.

What is claimed is:

1. A zoom lens comprising:
a negative lens unit arranged closest to an enlargement conjugate side among lens units having negative refractive power included in the zoom lens;
at least one positive lens unit having positive refractive power arranged closer to the enlargement conjugate side than the negative lens unit; and
a rear lens unit including at least one lens unit and arranged closer to a reduction conjugate side than the negative lens unit, wherein
a distance between adjacent lens units in the zoom lens is changed during zooming,
a stop is arranged closer to the reduction conjugate side than the negative lens unit,
the rear lens unit includes at least one positive lens, and following conditions are satisfied:

$|Lp/L| < 0.2$ $0.02 < \Delta\theta gFp < 0.08$ $Ndp > 1.75$ $0.5 < \phi p/\sqrt{(\phi w \cdot \phi t)} < 3.0$ $1.0 < fc/ft < 1.5$ where, at a telephoto end, a distance between the stop and a lens surface vertex, farthest from the stop, of the positive lens is Lp, a configuration length of the zoom lens is L, an anomalous dispersion characteristic of the positive lens is ΔθgFp, a refractive index at d-line of the positive lens is Ndp, power of the positive lens when there is the one positive lens or a sum of power of a plurality of the positive lenses when there is a plurality of the positive lenses is $\phi p$, power of the entire zoom lens at a wide-angle end is $\phi w$, power of the entire zoom lens at the telephoto end is $\phi t$, a focal length of the positive lens unit at the telephoto end when there is the one positive lens unit or a composite focal length of a plurality of the positive lens units at the telephoto end when there is a plurality of the positive lens units is fc, and a focal length of the entire zoom lens at the telephoto end is ft.

2. The zoom lens according to claim 1, wherein $|\theta gFAn - \theta gFAp| < 0.055$ is satisfied, where a relative partial dispersion of an i-th negative lens from the enlargement conjugate side among negative lenses included in the positive lens unit is $\theta gFni$, power of the i-th negative lens is $\phi ni$, a relative partial dispersion of an i-th positive lens from the enlargement conjugate side among positive lenses included in the positive lens unit is $\theta gFpi$, and power of the i-th positive lens is $\phi pi$, and $\theta gFAn = \Sigma(\theta gFni \cdot \phi ni)/\Sigma \phi ni$ $\theta gFAp = \Sigma(\theta gFpi \cdot \phi pi)/\Sigma \phi pi.$ 3. The zoom lens according to claim 1, wherein $|\theta gFBn - \theta gFBp| < 0.040$ is satisfied, where a relative partial dispersion of a j-th negative lens from the enlargement conjugate side among negative lenses included in the negative lens unit is $\theta gFnj$, power of the j-th negative lens is $\phi nj$, a relative partial dispersion of a j-th positive lens from the enlargement conjugate side among positive lenses included in the negative lens unit is $\theta gFpj$, and power of the j-th positive lens is $\phi pj$, and $\theta gFBn = \Sigma(\theta gFnj \cdot \phi nj)/\Sigma \phi nj$ $\theta gFBp = \Sigma(\theta gFjp \cdot \phi pj)/\Sigma \phi pj.$ 4. The zoom lens according to claim 1, wherein $|\theta gFTn - \theta gFTp| < 0.04$ is satisfied, where a relative partial dispersion of a k-th negative lens from the enlargement conjugate side among negative lenses included in the entire zoom lens is $\theta gFnk$, power of the k-th negative lens is $\phi nk$, a relative partial dispersion of a k-th positive lens from the enlargement conjugate side among positive lenses included in the entire zoom lens is $\theta gFpk$, and power of the k-th positive lens is $\phi pk$, and $\theta gFTn = \Sigma(\theta gFnk \cdot \phi nk)/\Sigma \phi nk$ $\theta gFTp = \Sigma(\theta gFpk \cdot \phi pk)/\Sigma \phi pk.$ 5. A projector comprising:
a light modulation element configured to modulate light from a light source; and
a zoom lens configured to project light through the light modulation element on a projection surface, wherein
the zoom lens includes:
a negative lens unit arranged closest to the projection surface among lens units having negative refractive power included in the zoom lens;
at least one positive lens unit having positive refractive power arranged closer to the projection surface than the negative lens unit; and
a rear lens unit including at least one lens unit and arranged closer to the light modulation element than the negative lens unit,
wherein
a distance between adjacent lens units in the zoom lens is changed during zooming,
a stop is arranged closer to the light modulation element than the negative lens unit is included,
the rear lens unit includes at least one positive lens, and following conditions are satisfied:

$|Lp/L| < 0.2$ $0.02 < \Delta \theta gFp < 0.08$ $Ndp > 1.75$ $0.5 < \phi p/\sqrt{(\phi w \cdot \phi t)} < 3.0$ $1.0 < fc/ft < 1.5$ where, at a telephoto end, a distance between the stop and a lens surface vertex, farthest from the stop, of the positive lens is Lp, a configuration length of the zoom lens is L, an anomalous dispersion characteristic of the positive lens is $\Delta \theta gFp$, a refractive index at d-line of the positive lens is Ndp, power of the positive lens when there is the one positive lens or a sum of power of a plurality of the positive lenses when there is a plurality of the positive lenses is $\phi p$, power of the entire zoom lens at a wide-angle end is $\phi w$, power of the entire zoom lens at the telephoto end is $\phi t$, a focal length of the positive lens unit at the telephoto end when there is the one positive lens unit or a composite focal length of a plurality of the positive lens units at the telephoto end when there is a plurality of the positive lens units is fc, and a focal length of the entire zoom lens at the telephoto end is ft.

* * * * *